US007854313B1

(12) United States Patent
Gotsche

(10) Patent No.: US 7,854,313 B1
(45) Date of Patent: Dec. 21, 2010

(54) ESCALATOR HANDRAIL SANITIZER

(76) Inventor: Jonathan Gotsche, 3307 Shinkle Dr., Roswell, NM (US) 88201

( * ) Notice: Subject to any disclaimer, the term of this patent is extended or adjusted under 35 U.S.C. 154(b) by 0 days.

(21) Appl. No.: 12/661,168

(22) Filed: Mar. 12, 2010

(51) Int. Cl.
*B65G 45/22* (2006.01)

(52) U.S. Cl. ...................................................... 198/495

(58) Field of Classification Search .................. 198/495
See application file for complete search history.

(56) References Cited

U.S. PATENT DOCUMENTS 3,941,241 A 3/1976 Hishitani
3,946,853 A * 3/1976 Ishida ........................ 198/494
4,623,060 A * 11/1986 Rulke ......................... 198/495
4,934,512 A 6/1990 Lin et al.
7,041,195 B2 5/2006 McLeod et al.
7,134,539 B2 11/2006 Kim

* cited by examiner

*Primary Examiner*—Joe Dillon, Jr.
(74) *Attorney, Agent, or Firm*—Paul R. Martin

(57) ABSTRACT

A sanitizer dispenser unit is mounted on escalator handrails, moving walkway railing or any revolving handrail. It would mount either on the in-going or out-going portion of the handrail, and would continuously sanitize the surface of the handrail with a micromist and be easily refillable by maintenance personnel.

8 Claims, 1 Drawing Sheet

ESCALATOR HANDRAIL SANITIZER

TECHNICAL FIELD OF THE INVENTION

The present invention relates to the general art of escalators, and to the particular field of escalator handrails.

BACKGROUND OF THE INVENTION

Generally, escalators are installed on plural stories of buildings in such a way that the escalator are connected to each other in the zigzag fashion, unlike elevators which travels between a riding story and a desired story. Accordingly, the escalators are predominantly used in department stores in which various products are sold, subways, airports, terminals and the like, to which people flock, rather than business buildings. Recently, moving walkways, which are horizontal traveling type of escalators, are used even in the same story, in order to reduce traffic.

The handrails associated with such systems serve as handgrip and are intended to prevent passengers from falling down or slipping. To prevent slippage by the passengers, the handrails are commonly made of a rubber material.

Since the handrails come into contact with hands of a multitude of people, if sanitary maintenance of the handrails is not assured, various viruses, bacteria and the like harmful to humans are apt to propagate on the handrails. Therefore, the handrails must be always maintained in the clean condition. Up to now, sanitary maintenance of the handrails has been fulfilled by frequently mopping and cleaning surfaces of the handrails with neutral detergent or antiseptic solution.

However, since the conventional handrails of escalators must be frequently cleaned manually, there is a problem in that the maintenance of the handrail requires very high costs. In addition, since the cleaning work cannot positively sterilize and disinfect the handrails by a simple wiping operation, the passengers are exposed to hazard such as disease and bacterial infection due to viruses and bacteria existing on the handrails.

Since escalators are used to transport a multitude of people, it is possible to maximize the advertising effectiveness for products and corporations by providing advertising copies to the escalators. However, heretofore, there are only triangular guide plates positioned at intersections of crossed escalators to prevent passengers' heads from being caught in the intersections, and small advertising boards erected at transferring area between successive escalators, as the advertising copies.

In department stores, etc., of some countries, until several years ago, an escalator girl has been stationed for each escalator and the cleaning and disinfection of the escalator belt were effected at ordinary times by the escalator girl using a house-cloth to which disinfecting solution was applied. Such stationing of elevator girls, however, has been abolished due to the difficulty of obtaining a personnel for such purpose and to an increased personnel expenses. However, there has not yet been developed a simple device capable of effecting during use of the belt the cleaning and disinfection of the belt in a manner sufficient to act for the role which escalator girls have played. For this reason, escalator belts, including those used in subway stations which have rapidly increased in recent years, are either left to be dirty or, at best, taken care of by an occasional cleaning. Such a situation is deleterious from the standpoint of public health and further, it gives an unclean feeling to those who utilize the escalator.

SUMMARY OF THE INVENTION

The above-discussed disadvantages of the prior art are overcome by a sanitizer dispenser unit which is mounted on escalator handrails, moving walkway railing or any revolving handrail. It would mount either on the in-going or out-going portion of the handrail, and would continuously sanitize the surface of the handrail with a micromist and be easily refillable by maintenance personnel. The unit embodying the present invention continuously sanitizes the hand rail so that nobody is required to hold onto a portion of the railing that has not been cleaned. This unit will be especially useful for international airports, amusement parks and the like where the threat of international disease spread is a major concern.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Referring to the figures, it can be understood that the present invention is embodied in a unit 10 that is associated with an escalator handrail 12 for dispensing sanitizer fluid onto a top surface 20 of the handrail for sanitizing that surface which is the surface engaged by a user when the user is riding the escalator associated with the handrail. The escalator handrail moves in direction 30 and moves past unit 10, which is stationary with respect to the moving handrail.

Figure 1:
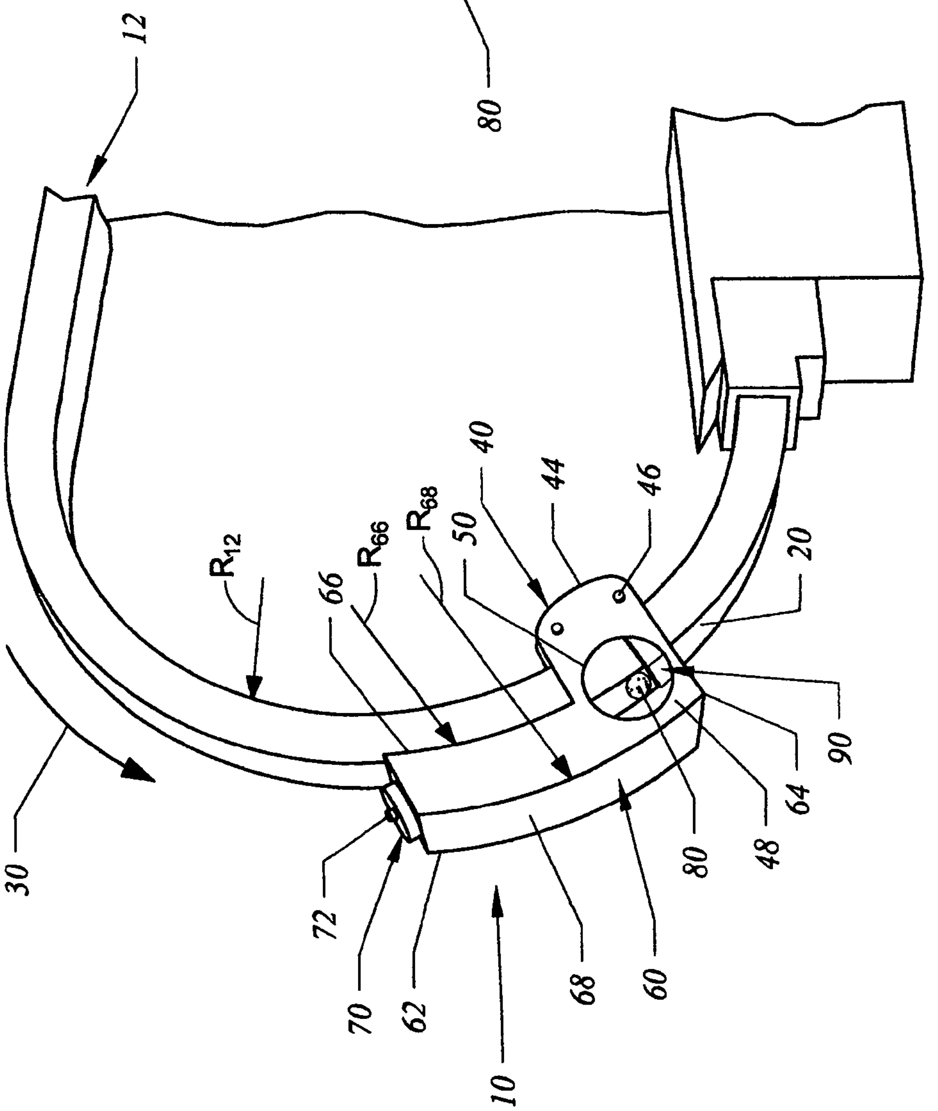
FIG. 1 is a perspective view of a sanitizer unit embodying the present invention in association with an escalator handrail.

Unit 10 includes a mounting bracket 40 that is fixedly attached to a stationary structure 42 which also supports the handrail. Bracket 40 includes a mounting end 44 having mounting elements, such as bolts 46, therethrough and a distal end 48. An opening 50 is defined through the bracket for a purpose which will be understood from the teaching of this disclosure. Mounting bracket 40 has two elements, one of which is shown in FIG. 1, with a second element being located on the other side of the handrail and being identical to the element shown in FIG. 1.

Unit 10 further comprises a hollow housing 60 that is located adjacent to top surface 20 of the handrail and which contains sanitizing liquid that is dispensed from the housing onto the top surface of the handrail to maintain that top surface clean. Housing 60 is arcuate in shape and includes a first end 62, a second end 64, a first wall 66 and a second wall 68. Walls 64 and 66 are arcuate with first wall 66 being interposed between the handrail and the second wall and having a radius of curvature $R_{66}$ that is equal to the radius of curvature $R_{12}$ of the handrail. Radius of curvature $R_{68}$ being equal to the radius of curvature $R_{12}$ allows the housing to be placed immediately adjacent to the handrail. Second wall 68 us also curved, but is curved at a radius of curvature $R_{68}$ that differs from the radius of curvature of the first wall so the two walls taper towards each other from the first end of the housing towards the second end of the housing for a purpose which will be understood from the teaching of this disclosure.

Housing 60 is oriented in an upright orientation so first end 62 is located above second end 64 whereby gravity acts on the liquid stored in the housing to create a pressure gradient therein which causes the pressure of the liquid located adjacent to housing second end 64 to exceed the pressure of the liquid located in the housing adjacent to housing first end 62. The tapered nature of the housing assists this effect.

Housing 60 further comprises a filler cap 70 which is removably mounted on the housing to close first end 62 when the cap is in place on the housing. Filler cap 70 includes a filler port 72 through which sanitizer liquid can flow into the housing to replenish the liquid dispensed from the housing during operation of the unit. The cap can be removed to clean the housing when desired.

Figure 2:
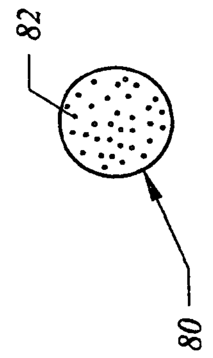
FIG. 2 shows a fluid dispensing port of the sanitizer unit.

Housing 60 further includes a fluid dispensing port 80 located in wall 68 adjacent to second end 64. Dispensing port 80 is located to be immediately adjacent to the top surface of the escalator hand rail so sanitizing liquid dispensed from port 80 flows onto the handrail top surface. As shown in FIG. 2, dispensing port 80 includes a plurality of fine ports, such as port 82, through which sanitizing fluid flows. The ports 82 break up fluid flowing therethrough into a fine mist so a micromist is applied to the top surface of the escalator handrail. The tapering shape of the housing as well as the upright orientation thereof creates a pressure gradient on the liquid in the housing sufficient to create the micromist.

A sponge 90 is mounted on the housing adjacent to second end 64 and adjacent to mounting bracket 40. Sponge 90 is located adjacent to opening 50 in the mounting bracket so the sponge can be accessed for cleaning, repair or replacement without requiring removal or dismantling of the unit 10.

Housing 60 preferably is made of plastic material.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A unit for sanitizing an escalator handrail comprising:

A) a mounting bracket which is mounted adjacent to an escalator handrail, the escalator handrail including a top surface which is engaged by the hand of a user when that user is using the escalator associated with the handrail;

B) a housing mounted on the mounting bracket located immediately superadjacent to the top surface of the escalator handrail, the handrail moving past the housing when the handrail is in use, the housing being hollow and adapted to contain sanitizing fluid for the handrail and including a first end and a second end, with the second end being located closely adjacent to the top surface of the escalator handrail, a fluid entrance port defined in the first end of the housing, a fluid dispensing port defined in the housing adjacent to the second end, the fluid dispensing port being located to dispense fluid from the interior of the housing onto the top surface of the escalator handrail as that top surface passes beneath the second end of the housing, and a closure cap removably mounted on the first end of the housing; and C) a sponge removably mounted on the mounting bracket immediately adjacent to the fluid dispensing port and located immediately downstream of the fluid dispensing port with respect to the direction of movement of the handrail relative to the housing, the sponge contacting the handrail after the handrail has passed the fluid dispensing port and has received sanitizing fluid from the housing via the fluid dispensing port.

2. The unit defined in claim 1 wherein the closure cap includes a filler port through which sanitizing fluid flows into the housing for filling the housing.

3. The unit defined in claim 2 wherein the housing is plastic.

4. The unit defined in claim 3 wherein the housing is tapered from the first end to the second end to direct flow of sanitizing fluid toward the liquid dispensing port.

5. The unit defined in claim 4 wherein the housing has an arcuate first wall which is located adjacent to the top surface of the escalator handrail and an arcuate second wall, with the first wall being interposed between the top surface of the escalator handrail and the second wall, the first wall having a radius of curvature essentially equal to the radius of curvature of the escalator handrail, the arcuate shapes of the first and second walls and their tapering directing sanitizing fluid in the housing toward the liquid dispensing port.

6. The unit defined in claim 5 wherein the mounting bracket has a opening defined therein adjacent to the sponge so the sponge can be accessed via the opening with the housing mounted on the escalator handrail by the mounting bracket whereby the sponge can be changed without removing the housing from its mounted condition adjacent to the escalator handrail.

7. The unit defined in claim 6 wherein the housing is oriented upright with the first end located above the second end.

8. The unit defined in claim 7 wherein the fluid dispensing port includes a plurality of dispensing holes which break up sanitizing liquid passing therethrough into a mist before the liquid contacts the top surface of the escalator handrail.

* * * * *